United States Patent
Murphy et al.

(10) Patent No.: US 10,470,078 B2
(45) Date of Patent: Nov. 5, 2019

(54) NETWORK OPTIMIZATION BASED ON CHARACTERISTIC INFORMATION REGARDING A NETWORK

(71) Applicant: Viavi Solutions UK Limited, Berkshire (GB)

(72) Inventors: Christopher Michael Murphy, Bath (GB); Howard John Thomas, Stonehouse (GB); David Charles Padfield, Whiltshire (GB); Mohsen Zadeh-Koochak, Abingdon (GB); Mihai Stanciuc, Berkshire (GB); Nicolas G. Cotanis, Warrenton, VA (US); Peter Randall, Abingdon (GB)

(73) Assignee: VIAVI Solutions UK Limited, Newbury (GB)

( * ) Notice: Subject to any disclaimer, the term of this patent is extended or adjusted under 35 U.S.C. 154(b) by 196 days.

(21) Appl. No.: 15/435,988

(22) Filed: Feb. 17, 2017

(65) Prior Publication Data
US 2017/0245176 A1    Aug. 24, 2017

Related U.S. Application Data

(60) Provisional application No. 62/297,363, filed on Feb. 19, 2016.

(51) Int. Cl.
*H04L 12/24*    (2006.01)
*H04W 28/08*    (2009.01)
(Continued)

(52) U.S. Cl.
CPC .......... *H04W 28/08* (2013.01); *H04L 41/145* (2013.01); *H04L 43/0811* (2013.01);
(Continued)

(58) Field of Classification Search
None
See application file for complete search history.

(56) References Cited

U.S. PATENT DOCUMENTS 5,678,184 A  * 10/1997 Cutler, Jr. .......... H04B 7/18541
                                                        455/13.1
2003/0023750 A1* 1/2003 Basturk .................. H04L 45/12
                                                        709/241

(Continued)

OTHER PUBLICATIONS

Sajal K. Das et al., "A dynamic load balancing strategy for channel assignment using selective borrowing in cellular mobile environment," Oct. 1, 1997, 15 pages.

(Continued)

*Primary Examiner* — Nicholas Sloms
(74) *Attorney, Agent, or Firm* — Harrity & Harrity, LLP

(57) ABSTRACT

A device may detect a service condition associated with a network. The device may determine a prioritization of cells of the network based on characteristics of one or more subscribers to the cells of the network. The characteristics may include at least one of: a service type characteristic, an application type characteristic, a mobility characteristic, a vector characteristic, an altitude characteristic, a position characteristic, a location type characteristic, a device type characteristic, a device capability characteristic, a connection characteristic, a subscription characteristic, a call type characteristic, a user profile characteristic, a terrain characteristic, or an operator relationship characteristic. The device may perform an alteration to one or more network parameters based on the prioritization of cells of the network to reduce an impact of the service condition.

20 Claims, 7 Drawing Sheets

(51) Int. Cl.
  *H04W 8/18*    (2009.01)
  *H04W 24/02*   (2009.01)
  *H04W 24/04*   (2009.01)
  *H04L 12/26*   (2006.01)
  *H04L 12/851*  (2013.01)
  *H04W 16/24*   (2009.01)
  *H04W 36/00*   (2009.01)
  *H04W 76/14*   (2018.01)

(52) U.S. Cl.
  CPC .............. *H04L 47/24* (2013.01); *H04W 8/18* (2013.01); *H04W 16/24* (2013.01); *H04W 24/02* (2013.01); *H04W 24/04* (2013.01); *H04W 36/0061* (2013.01); *H04W 76/14* (2018.02)

(56) References Cited

U.S. PATENT DOCUMENTS

| | | | |
|---|---|---|---|
| 2003/0078043 A1* | 4/2003 | Horwath | H04W 36/18 455/436 |
| 2004/0162074 A1* | 8/2004 | Chen | H04W 36/04 455/437 |
| 2010/0210255 A1 | 8/2010 | Amirijoo et al. | |
| 2010/0216453 A1 | 8/2010 | Kallin et al. | |
| 2011/0249578 A1* | 10/2011 | Nayeb Nazar | H04L 1/0027 370/252 |
| 2013/0013204 A1* | 1/2013 | Kazama | G01C 21/20 701/533 |
| 2013/0287012 A1* | 10/2013 | Pragada | H04W 76/25 370/338 |
| 2014/0162661 A1 | 6/2014 | Shaw et al. | |
| 2014/0269269 A1* | 9/2014 | Kowali | H04W 24/08 370/229 |
| 2015/0264630 A1* | 9/2015 | Saska | H04W 48/02 370/230 |
| 2015/0304222 A1* | 10/2015 | Ko | H04W 40/24 370/241 |
| 2016/0174117 A1* | 6/2016 | Wong | H04W 36/0083 455/444 |
| 2016/0212758 A1* | 7/2016 | Leung | G06Q 10/00 |

OTHER PUBLICATIONS

Extended European Search Report corresponding to EP 1715678.1 dated Jul. 14, 2017, 11 pages.

* cited by examiner

NETWORK OPTIMIZATION BASED ON CHARACTERISTIC INFORMATION REGARDING A NETWORK

RELATED APPLICATION(S)

This application claims priority under 35 U.S.C. § 119 to U.S. Provisional Patent Application No. 62/297,363, filed on Feb. 19, 2016, the content of which is incorporated by reference herein in its entirety.

BACKGROUND

A self-organizing network (SON or SON network) is an automation technology designed to make planning, configuration, management, optimization, and healing of mobile radio access networks simpler and faster. For example, a SON enables a network to perform set-up and management of network resources to optimize or improve performance. Self-healing mechanisms in a SON may be triggered to compensate for a detected network outage. SON functionality and behavior has been defined and specified in the 3rd Generation Partnership Project (3GPP) and the Next Generation Mobile Networks (NGMN).

SUMMARY

According to some possible implementations, a method may include determining, by a device, a service condition relating to a first portion of a network. The service condition may relate to a network outage or a degraded network performance. The method may include determining, by the device, a prioritization for a plurality of portions of the network based on determining the service condition relating to the first portion of the network. The plurality of portions of the network may include the first portion of the network. The prioritization for the plurality of portions of the network may be related to characteristics of one or more subscribers of the network. The method may include altering, by the device, one or more network parameters associated with a second portion of the network, of the plurality of portions of the network, based on the prioritization for the plurality of portions of the network.

According to some possible implementations, a non-transitory computer-readable medium may store instructions that, when executed by one or more processors, cause the one or more processors to determine a set of characteristics of a set of user devices connected to cells of a network. The one or more instructions, when executed by the one or more processors, may cause the one or more processors to determine a prioritization of the cells of the network based on the set of characteristics of the set of user devices connected to the cells of the network. The one or more instructions, when executed by the one or more processors, may cause the one or more processors to classify the cells of the network as candidate cells or non-candidate cells based on the prioritization of the cells of the network. The one or more instructions, when executed by the one or more processors, may cause the one or more processors to detect a service condition relating to a cell of the cells of the network. The one or more instructions, when executed by the one or more processors, may cause the one or more processors to perform an alteration to one or more network parameters of the candidate cells to mitigate an impact of the service condition based on a set of network metrics relating to the network.

According to some possible implementations, a device may include one or more processors. The one or more processors may be configured to detect a service condition associated with a network. The one or more processors may be configured to determine a prioritization of cells of the network based on characteristics of one or more subscribers to the cells of the network. The characteristics may include at least one of: a service type characteristic, an application type characteristic, a mobility characteristic, a vector characteristic, an altitude characteristic, a position characteristic, a location type characteristic, a device type characteristic, a device capability characteristic, a connection characteristic, a subscription characteristic, a call type characteristic, a user profile characteristic, a terrain characteristic, or an operator relationship characteristic. The one or more processors may be configured to perform an alteration to one or more network parameters based on the prioritization of cells of the network to reduce an impact of the service condition.

DETAILED DESCRIPTION

Figure 1:
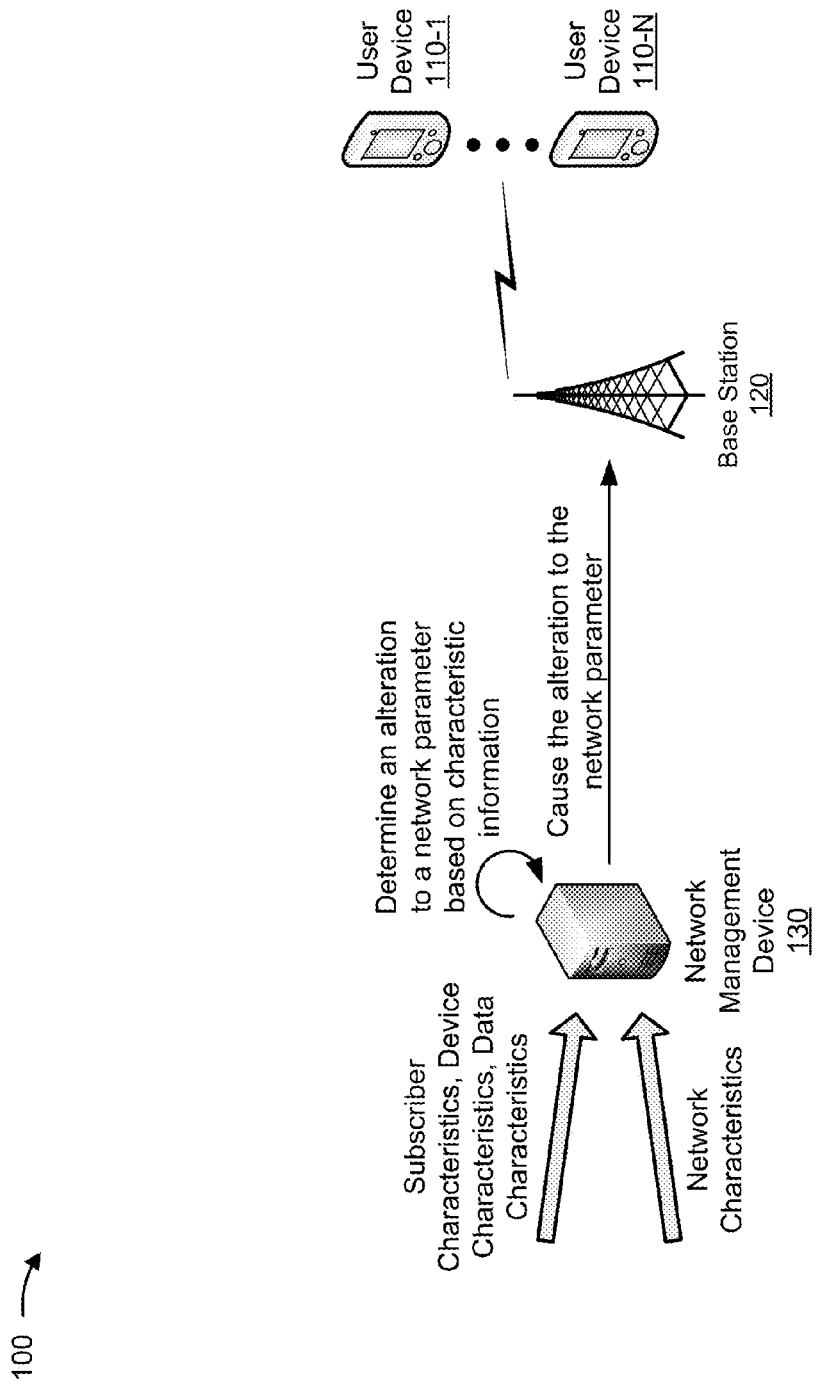
FIG. 1 is a diagram of an overview of an example implementation described herein.

The following detailed description of example implementations refers to the accompanying drawings. The same reference numbers in different drawings may identify the same or similar elements.

A portion of a network (e.g., one or more segments of radio frequency bandwidth, power, and time that are provided by one or more network cells) may be associated with a base station that provides network connectivity to a set of user devices. Each user device, of the set of user devices, may be associated with a subscriber (e.g., a user of the user device, an owner of the user device, a sensor connected to the user device in an Internet of Things (IoT) configuration, etc.). A level of service or another performance metric (e.g., operational expense, average revenue per user, etc.) may be determined based on a service level agreement (SLA) that may define a set of key performance indicators (KPIs). When a first portion of the network is associated with an apparent or predicted inability to deliver a required level of service or when an opportunity to improve a level of service to the set of user devices or a subset of user devices is detected (e.g., a portion of the network may have triggered a critical zone detection threshold that may also take into account the geolocated subscriber distribution), a network operator may select a second portion of the network for utilization in relieving the service requirement associated with the first portion of the network. The second portion of the network may include another cell, another network slice, etc. For example, the network operator may cause a set of user devices associated with the first portion of the network to transfer to the second portion of the network. However, utilizing the second portion of the network to relieve the congestion condition of the first portion of the network may degrade performance of the second portion of the network.

In this case, user devices associated with the second portion of the network may fail to receive a quality of service selected for subscribers of the user devices, may fail to receive sufficient network performance for a type of data being transmitted and/or received by the user devices, or the like.

Implementations described herein may classify portions of a network based on a prioritization associated with the set of user devices to which implementations provided herein provide connectivity and may alter parameters of the network based on the prioritization. For example, a network management device may determine the prioritization based on a subscriber identity, a current or historic subscriber activity, a current or historic subscriber billing activity, a subscriber class (e.g., that the subscriber provides emergency management services), an importance of the current subscriber activity (e.g., a two-party call versus a conference call or an emergency call), a membership in a particular network slice (e.g., an emergency services network slice, a machine type communication (MTC) network slice, etc.), or the like, and may utilize the prioritization to determine which parameters to alter. In this way, when the second portion of the network is classified as a higher priority than the first portion of the network (e.g., associated with user devices of a relatively higher subscriber priority level or transferring traffic with a relatively higher importance), a network management device may omit the second portion of the network from utilization in relieving the service condition of the first portion of the network. Additionally, or alternatively, the network management device may alter a service provided to the second portion of the network (e.g., by transferring to providing a text message only service) to maintain service for the second portion of the network. In this way, network performance may be improved based on ensuring that network resources are allocated correctly for requirements of different portions of the network and/or user devices connected to the different portions of the network.

A portion of the network with a high prioritization may be utilized in relieving the service requirement when the set of user devices from which that prioritization was derived is still provided sufficient service after the utilization by that or other network portions. Portions of the network may be configured differently based on the priority of the subscribers that are located within that network portion's coverage or are determined will be in that network portion's coverage after the utilization.

Moreover, implementations described herein may alter network parameters iteratively. An initial response may be performed more rapidly than a subsequent response (e.g., using an omission mechanism for network portions and/or historic calculation), and may provide a lesser remediation of the service condition. The subsequent response may be performed less rapidly (e.g., based on relatively greater computing resource requirements and/or based on more accurate data being collected), such as determining an omitted network portion where high priority subscribers are still provided with sufficient service by that or other network portions, and may provide a greater remediation of the service condition.

In general the load applied to the network may be described by a "vector" of geographically distributed subscribers with a variety of mobile types with multiple priority levels presenting a time-varying demand; the performance may be described by a "vector" of subscriber centric key performance indicators (KPIs) (e.g., dropped call rate or frame erasure rate); and the recommendations as a "vector" of cell parameter changes, antenna parameter changes, or another type of network entity parameter changes.

Moreover, implementations described herein may pre-emptively determine an effect of a network outage to (or degraded network performance for) a portion of the network, and may pre-emptively calculate an alteration to the network (e.g., allocating additional resources, altering signal strengths, or selecting portions of a network to which traffic from other portions of the network may be directed) to mitigate the effect of the network outage. In this case, the network management device may utilize the prioritization to reduce a likelihood that the calculated alteration has a negative impact to network performance relative to calculating the alteration without determining the prioritization. Based on pre-emptively calculating the alteration, the network management device may reduce a quantity of time required to alter the network to compensate for a subsequent network outage, thereby improving network performance relative to calculating alterations after a network outage occurs.

Moreover, implementations described herein may determine an interaction of the network parameter changes to address the outage, for utilization in controlling one or more self-organizing network functionalities. For example, based on mobility robustness, self-healing techniques, and/or identification of a special event affecting network coverage (e.g., a sports event, a holiday, a parade, a road congestion scenario, etc.) handover and reselection parameters may be determined preferentially for a subset of subscribers. Similarly, when determining a mobility load-balancing adjustment to transmit powers, handover thresholds, admission control parameters, etc. the network management device may determine one or more tilts and reselection parameters preferentially for a subset of subscribers. Similarly, for automatic neighbor relation determination, the network management device may determine one or more neighbor lists and associated handover parameters preferentially for a subset of subscribers.

Moreover, implementations described herein may utilize input received from one or more selected providers, such as a server utilized by emergency management personnel, and may incorporate the input (e.g., recommendations regarding parameter adjustments) preferentially for a subset of subscribers. In this way, a network management device may improve network performance relative to another technique for management of a network based on ensuring that service is provided to high priority subscribers.

FIG. 1 is a diagram of an overview of an example implementation 100 described herein. As shown in FIG. 1, example implementation 100 includes a set of user devices 110-1 through 110-N connected to a base station 120, which is connected to a network management device 130.

As further shown in FIG. 1, network management device 130 may receive characteristic information regarding a network. For example, network management device 130 may receive information associated with determining a priority parameter associated with a portion of a network (e.g., a network cell priority level, a call priority level, or a subscriber priority level), such as a stored prioritization rule that may be utilized to determine the priority parameter. In this case, the information may include subscriber characteristic information (e.g., information regarding a subscriber, such as a subscriber service plan or a subscriber type, or a call type, such as a party to an emergency call), device characteristic information (e.g., information regarding a particular user device 110, such as a network capability, a location, a manufacturer of user device 110, a model or type of user device 110, etc.), data characteristic information (e.g., information regarding data being transmitted via the portion of the network, such as a quality of service (QoS) requirement, a network slice associated with the data, or a type of the data), or the like. Additionally, or alternatively, network management device 130 may receive network characteristic information, such as information identifying a congestion level, information identifying a coverage hole associated with the portion of the network (e.g., a portion of the network with impaired network coverage), information indicating whether users are located at an indoors or outdoors location, in a mobile or stationary position, whether users are classified with a threshold priority (e.g., very important persons (VIP) users), whether a user is an enterprise user, or the like.

As further shown in FIG. 1, based on receiving the characteristic information, network management device 130 may determine an alteration to a network parameter and cause the alteration to the network parameter. For example, when network management device 130 detects an outage (or degraded network performance that satisfies a threshold, such as a critical zone detection for a portion of the network) based on the network characteristic information, network management device 130 may selectively alter one or more parameters of base station 120 based on the priority parameter to mitigate the outage. In this case, network management device 130 may determine that user devices 110-1 through 110-N are associated with a threshold subscriber level (e.g., a relatively high priority level) and transmitting a particular type of data (e.g., requiring a relatively high level of network performance), and may determine that base station 120 is to be omitted from a set of base stations 120 receiving one or more other user devices 110. Network management device 130 may cause the one or more other user devices 110 to be transferred to utilizing another one of the set of base stations 120 (e.g., associated with a relatively lower priority).

Additionally, or alternatively, network management device 130 may pre-emptively alter a network parameter prior to detecting an outage (or degraded network performance) to reduce a likelihood of an outage based on the network cell priority level. For example, network management device 130 may determine, based on the priority parameter, that a signal strength of base station 120 is to be increased, thereby improving network performance for user devices 110-1 through 110-N. In this way, network management device 130 may reduce a likelihood of an outage or a duration of an outage relative to waiting to detect an outage. Additionally, or alternatively, network management device 130 may perform one or more other optimization techniques based on the characteristic information and/or the priority parameter.

In another example, network management device 130 may obtain a set of classification rules, a set of records relating to subscriber experience with the network (e.g., experienced latency, experienced bit error rate, experienced coverage, etc.), a set of filter records of subscriber experience (e.g., subscriber experience associated with a set of high priority users), and may utilize a classification engine to generate a classification relating to priority and/or to classifying a network cell as a candidate cell or a non-candidate cell, as described herein.

In this way, network management device 130 improves performance of the network relative to permitting the network to operate without obtaining and utilizing characteristic information associated with determining a prioritization for portions of the network, such as subscriber characteristics, device characteristics, and/or data characteristics.

As indicated above, FIG. 1 is provided merely as an example. Other examples are possible and may differ from what was described with regard to FIG. 1.

Figure 2:
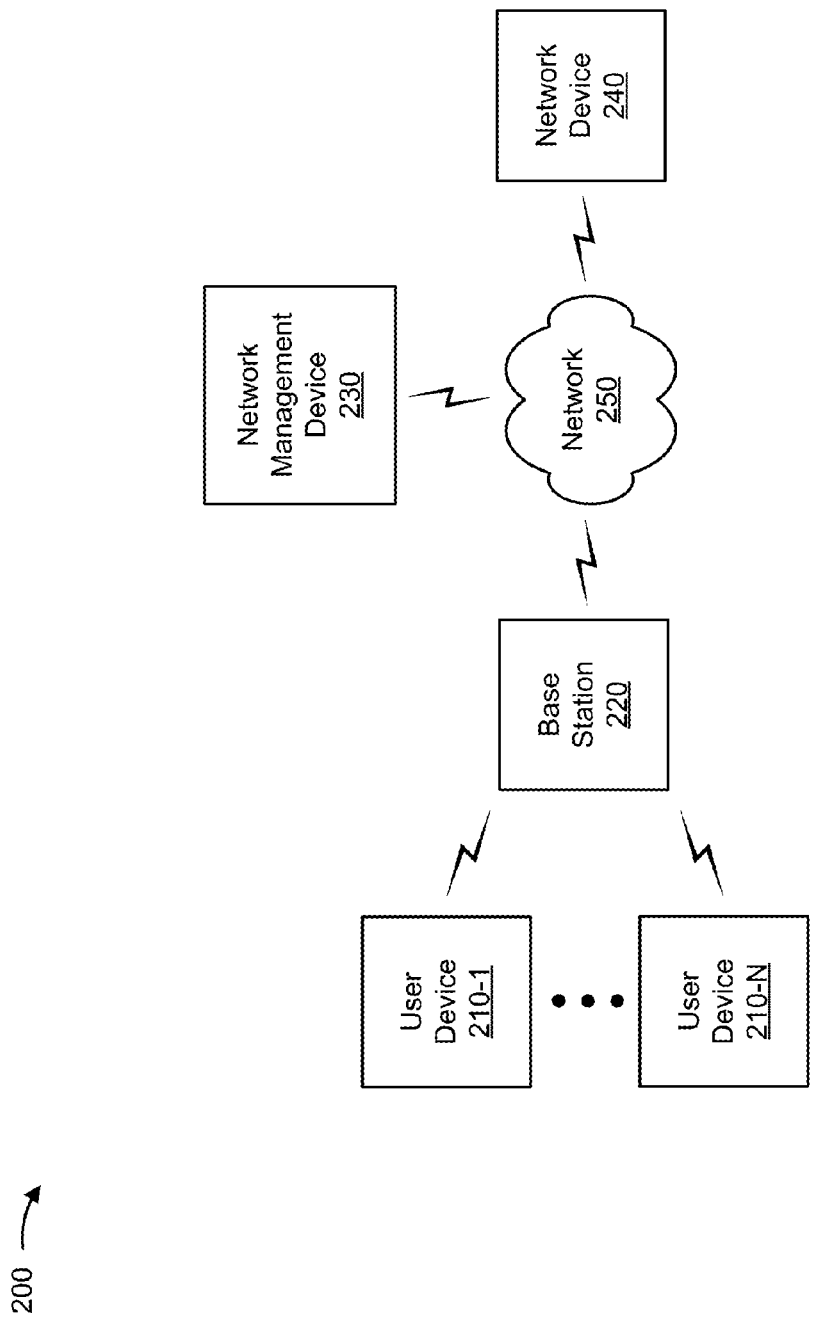
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user devices 210-1 through 210-N (N≥1) (hereinafter referred to collectively as "user devices 210," and individually as "user device 210"), base stations 220-1 through 220-M (M≥1) (hereinafter referred to collectively as "base stations 220," and individually as "base station 220"), a network management device 230, a network device 240, and a network 250. Devices of environment 200 may interconnect via wired connections, wireless connections, or a combination of wired and wireless connections.

User device 210 includes a device capable of receiving, generating, storing, processing, and/or providing information, such as information described herein. For example, user device 210 may include a computing device (e.g., a desktop computer, a laptop computer, a tablet computer, a handheld computer, a server, etc.), a mobile phone (e.g., a smart phone, a radiotelephone, etc.), a wearable device (e.g., a smartwatch or a pair of smart eyeglasses), an Internet of Things (IoT) device, a machine type communication (MTC) device, or a similar device. In some implementations, user device 210 corresponds to user device 110 shown in FIG. 1. In some implementations, user device 210 may receive information from and/or transmit information to base station 220.

Base station 220 includes one or more devices capable of communicating with user device 210 using a cellular radio access technology. For example, base station 220 may include a base transceiver station, a radio base station, a node B, an evolved node B (eNB), a base station subsystem, a cellular site, a cellular tower (e.g., a cell phone tower, a mobile phone tower, etc.), a radio access node, a macrocell base station, a microcell base station, a picocell base station, a femtocell base station, or a similar type of device. Base station 220 may transfer traffic between user device 210 and network 250. In some implementations, base station 220 corresponds to base station 120 shown in FIG. 1. In some implementations, base station 220 may communicate with user device 210 (and/or one or more other devices) using radio waves.

Network management device 230 includes a device capable of receiving, generating, storing, processing, and/or providing information associated with a configuration of a network. For example, network management device 230 may include a server associated with determining a configuration of one or more base stations 220, network devices 240, or the like, and causing an alteration to the one or more base stations 220, network devices 240, or the like based on the configuration. In some implementations, network management device 230 may include a centralized device, such as a server associated with network 250. Additionally, or alternatively, network management device 230 may include a distributed device, such as a set of computing devices associated with a set of base stations 220 of network 250. Additionally, or alternatively, network management device 230 may be associated with a set of other network devices 240, such as a base band unit (BBU) hotel, a multimedia management entity (MME), or the like. In some implementations, network management device 230 corresponds to network management device 130 shown in FIG. 1. In some implementations, network management device 230 may receive information from and/or transmit information to one or more other devices of environment 200.

Network device 240 includes one or more devices (e.g., one or more traffic transfer devices) capable of processing and/or transferring traffic associated with network 250. For example, network device 240 may include a firewall, a router, a gateway, a switch, a hub, a bridge, a home subscriber server (HSS), a serving gateway (SGW), a packet data network gateway (PGW), a mobility management entity, an access, authentication, and authorization (AAA) server, a load balancer, a BBU hotel, a front-haul aggregation point, an MME, a call session control function (CSCF), a policy and charging rules function (PCRF), a packet control unit (PCU), a serving general packet radio service (GPRS) support node (SGSN), a mobile switching center server (MSS), a media gateway (MGW), or a similar device. In some implementations, network device 240 may provide information to network management device 230 associated with determining a prioritization associated with a portion of a network. In some implementations, network device 240 may receive information from network management device 230 associated with causing an alteration to network 250. In some implementations, network device 240 may receive information from and/or transmit information to one or more other devices of environment 200.

Network 250 includes one or more wired and/or wireless networks. For example, network 250 may include a cellular network (e.g., a long-term evolution (LTE) network, a 3G network, a 4G network, a 5G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, an unlicensed frequency band network, a device to device communications network, an Ethernet network, an Internet Protocol (IP) network, a multiprotocol label switching (MPLS) network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, although base station 220 and network management device 230 are shown as separate devices, base station 220 and network management device 230 may implemented via a single device (e.g., a base station including a self-organizing network functionality). Additionally, or alternatively, a set of devices (e.g., one or more devices) of environment 200 may perform one or more functions described as being performed by another set of devices of environment 200.

Figure 3:
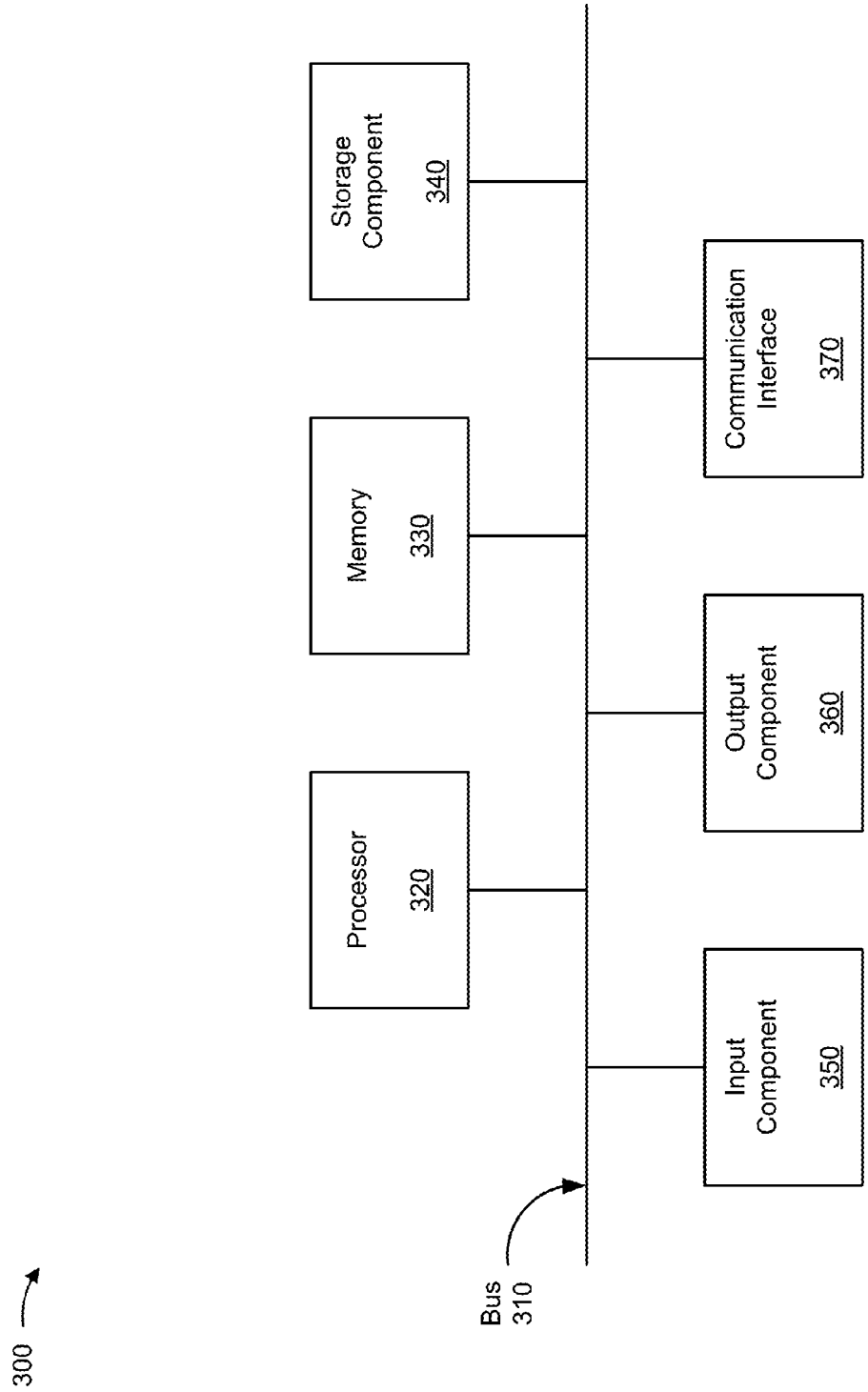
FIG. 3 is a diagram of example components of one or more devices of FIG. 2.

FIG. 3 is a diagram of example components of a device 300. Device 300 may correspond to user device 210, base station 220, network management device 230, and/or network device 240. In some implementations, user device 210, base station 220, network management device 230, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
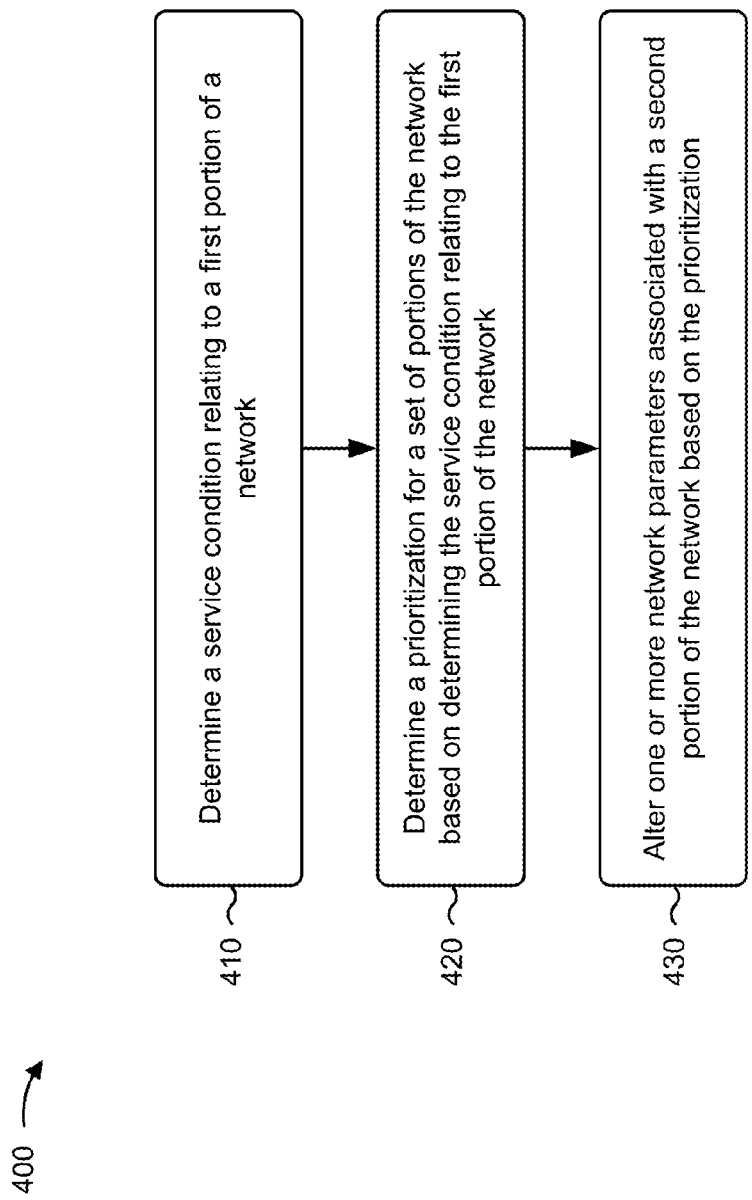
FIG. 4 is a flow chart of an example process for network optimization based on characteristic information regarding a network.

FIG. 4 is a flow chart of an example process 400 for network optimization based on characteristic information regarding a network. In some implementations, one or more process blocks of FIG. 4 may be performed by network management device 230. In some implementations, one or more process blocks of FIG. 4 may be performed by another device or a group of devices separate from or including network management device 230, such as user device 210, base station 220, and/or network device 240.

As shown in FIG. 4, process 400 may include determining a service condition relating to a first portion of a network (block 410). For example, network management device 230 may determine a service condition relating to a first portion of network 250. In some implementations, the service condition may be an expected service condition, such as based on scheduled network maintenance activity, energy saving activity, or the like. Additionally, or alternatively, the service condition may be an unexpected service condition, such as based on a power loss, a wire being severed, an atmospheric condition, a device crashing, or the like.

In some implementations, network management device 230 may determine the service condition based on detecting a network outage for the first portion of network 250. Additionally, or alternatively, network management device 230 may determine the service condition based on detecting degraded network performance for the first portion of network 250.

In some implementations, the service condition may be an actual service condition (e.g., a network outage, degraded network performance, or the like). Additionally, or alternatively, the service condition may be a simulated service condition (e.g., to simulate performance of the network and pre-configure responses to an actual service condition). In this case, network management device 230 may generate the simulated service condition. In some implementations, the simulated service condition may be a predicted service condition for the first portion of network 250.

As further shown in FIG. 4, process 400 may include determining a prioritization for a set of portions of the network based on determining the service condition relating to the first portion of the network (block 420). For example, network management device 230 may determine a prioritization for a set of portions of network 250 based on determining the service condition relating to the first portion of network 250. Additionally, or alternatively, network management device 230 may periodically determine a prioritization for the set of portions of network 250, and may obtain the prioritization (e.g., a most recently determined prioritization) based on determining the service condition. In some implementations, the set of portions of network 250 may include the first portion of network 250.

In some implementations, the prioritization for the set of portions (i.e., cells) of network 250 may be related to one or more characteristics of one or more subscribers of network 250. For example, the characteristics of the subscribers of network 250 and/or user devices 210 utilized by the subscribers may include a subscriber identity, a current or historic subscriber activity, a current or historic subscriber billing activity, a subscriber class (e.g., that the subscriber provides emergency management services), a level of importance of the current subscriber activity (e.g., a two-party call, a conference call, or an emergency call each having a different level of importance). In some implementations, the characteristics of the subscribers of network 250 may relate to a service type (e.g., a subscribed QoS class), an application type (Internet protocol television (IPTV), voice over Internet protocol (VoIP), social media utilization, video stream, or the like), a brand (e.g., a particular on-demand IPTV service might pay an operator for higher QoS for its subscribers relative to a competitor's service), and/or a mobility (e.g., a speed of travel of a subscriber determined based on a corresponding user device 210).

In some implementations, the characteristics of the subscribers of network 250 may be determined by network management device 230 as a vector (e.g., users' direction and speed). For example, network management device 230 may classify portions of network 250 based on a prioritization relating use of user devices 210 in the portions of network 250. In this case, network management device 230 may prioritize portions (i.e., cells) of network 250 based on a mobility characteristic (e.g., groups of users travelling up/down arterial roads or railways), an altitude characteristic (e.g., an altitude of user device 210), a position characteristic (e.g., indoor or outdoor use of user device 210), a location type characteristic (e.g., use of user device 210 in a home, an office, a mall, a cinema, a restaurant, an airport, a stadium, a park), a user device type characteristic (e.g., a particular brand of mobile phone, tablet, etc.), a user device capability characteristic (e.g., 4G/3G/2G capable user devices 210 being connected versus 3G/2G only user devices 210 being connected), a connection characteristic (e.g., machine-to-machine (M2M) or voice calling user devices 210), and/or a user profile characteristic (e.g., business users or personal users of user devices 210).

In some implementations, the characteristics of the subscribers of network 250 may be associated with a call party characteristic (e.g., a conference call may have a higher level of importance than a two party call and/or a conference call may include a high priority subscriber even if the network 250 issue concerns an otherwise low priority subscriber). Additionally, or alternatively, the characteristics of the subscribers of network 250 may be associated with whether simultaneous calls by a single user device 210 may also be occurring that taken together raise the priority of a subscriber. For example, when a single user device 210 is performing multiple concurrent data calls and/or voice calls, network management device 230 may determine that each data call and/or voice call, individually, fails to cause the single user device 210 to satisfy a prioritization threshold associated with classifying the single user device 210 or a portion of network 250 as high priority. In this case, network management device 230 may determine that, taken collectively, the multiple concurrent data and/or voice calls cause the single user device 210 to satisfy the prioritization threshold. In this way, network management device 230 may account for an aggregated impact of multiple factors in determining a prioritization relating to a cell.

In some implementations, the characteristics of the subscribers of network 250 may include information associated with a terrain characteristic (e.g., a presence of a body of water, a mountain, a forest, an urban area, a basement, an underwater location), a subscription characteristic relating to an ability of user devices 210 to connect to alternative networks 250 (e.g., a device-to-device (D2D) network, an ad hoc network, a Wi-Fi network, a fixed line network, or the like), a customer profile characteristic (e.g. a home address, tariff information, a billing history, a payment history, or the like), an operator relationship characteristic (e.g., a home user, a roaming user (from within the same country), and/or a roaming user (from outside of the same country)), or the like. In some implementations, the characteristics of the subscribers of network 250 may cause network management device 230 to determine multiple classifications of high priority subscribers. For example, network management device 230 may determine tiers of subscribers that may include multiple tiers of high priority subscribers.

In some implementations, network management device 230 may exclude a cell from being classified in a group of candidate cells based on characteristics of the cell with respect to high priority subscribers. For example, network management device 230 may exclude a cell from being a candidate cell based on network management device 230 determining that the high priority subscribers (and user devices 210 associated therewith) have been active in the cell within a threshold period of time (e.g., within 15 minutes, 30 minutes, 45 minutes, or the like). In this way, network management device 230 may ensure that network parameters are not adjusted for cells that include high priority subscribers.

In some implementations, network management device 230 may determine a prioritization for a cell based on a determination of a lack of movement of a high priority subscriber. For example, network management device 230 may determine that a subscriber and/or user device 210 associated with a high priority subscriber is not moving in a cell based on receiving location information for the high priority subscriber, based on calculating a Doppler effect on a signal associated with the high priority subscriber, based on a quantity of handoffs for the high priority subscriber in a threshold period of time (e.g., as indicated by the high priority subscriber movement from cell to cell), or the like. In this case, network management device 230 may determine that the subscriber is associated with a threshold likelihood of remaining in the cell, and may determine that the cell is a high priority cell.

In some implementations, network management device 230 may determine a prioritization of a cell based on network management device 230 determining that the high priority subscribers have been active in the cell historically (e.g., within the previous day, within the previous week, within the previous month, or the like). In some implementations, network management device 230 may store high priority subscriber historical data in a data structure.

In some implementations, network management device 230 may combine characteristics for increased granularity of classification. For example, network management device 230 may combine multiple classifications for user devices 210 that are indoors, that are stationary, that satisfy a threshold priority score, that are within high-rise buildings, and that are within low flying vehicles (e.g., drones) to determine a combined classification based on multiple characteristics. As another example, network management device 230 may generate a combined classification for user devices 210 that are outdoors, mobile, and/or emergency service voice users.

In some implementations, network management device 230 may classify a group of subscribers, user devices 210, or portions of network 250 as high priority based on a set of characteristics. For example, network management device 230 may determine that a set of characteristics relating to the subscribers, user devices 210, portions of network 250, or combinations thereof satisfy a threshold associated with a high priority classification. In this case, network management device 230 may optimize the performance of a particular portion of network 250 to provide better performance to the subscribers classified as high priority relative to subscribers classified as low priority or another classification.

Although described herein in terms of high priority and low priority, other levels of prioritization may be possible.

In some implementations, network management device 230 may classify a base station 220 as a candidate base station 220 for providing network resources to mitigate the service condition based on the prioritization (e.g., based on a threshold level of prioritization of base station 220, based on a comparison of respective prioritization levels of base stations 220, etc.). Similarly, network management device 230 may classify a base station 220 as a non-candidate base station 220 for providing network resources to mitigate the service condition based on the prioritization.

In some implementations, network management device 230 may classify a user device 210 as a candidate user device 210 for providing network resources to mitigate the service condition based on the prioritization. For example, network management device 230 may determine that user device 210 is to be assigned a reduced network resource allocation to ensure increased availability of network resources for another user device 210 and/or a portion of network 250 associated therewith. Additionally, or alternatively, network management device 230 may classify a user device 210 as a non-candidate user device 210 based on the prioritization.

In some implementations, network management device 230 may classify a cell as a candidate cell for providing network resources to mitigate the service condition based on the prioritization. As another example, network management device 230 may classify a cell into a group of non-candidate cells that are to be omitted from providing network resources to mitigate the service condition based on the prioritization.

In some implementations, network management device 230 may identify network elements (i.e., base stations 220, user devices 210, cells, portions of cells, etc.), or groups of network elements for optimization based on lower level per-subscriber data rather than the aggregated statistics calculated on a per network element basis. Additionally, or alternatively, network management device 230 may prioritize subscribers based on location or area. By estimating the location of each subscriber, network management device 230 may resolve the performance of different parts of a coverage area, and may prioritize network 250, accordingly. In some implementations, network management device 230 may achieve a higher granularity/resolution of performance by location, by morphology (urban, dense urban, rural, or the like), by area type (e.g., presence of a road, a building, a park, a residence, a retail store, or the like). Based on the higher granularity, network management device 230 may determine a higher priority for more important subscribers.

By using higher resolution (e.g., per subscriber) data to prioritize network resources, network management device 230 may determine problems that are not evident in coarser statistics. For example, there may be a subset of the connections that experience a problem in an area, and the subset may be localized (e.g., to one or more relatively small areas, to a particular group of subscribers, or the like). In this case, because the subset of connections may include information about the performance of hundreds, thousands, or more connections across a relatively large area, a set of aggregated network-element level statistics may mask the poor performance. In some implementations, network management device 230 may use the high resolution data to resolve network 250 issues that may be localized to particular areas or subscribers.

As further shown in FIG. 4, process 400 may include altering one or more network parameters associated with a second portion of the network based on the prioritization (block 430). For example, network management device 230 may alter one or more network parameters associated with a second portion of network 250 based on the prioritization for the set of portions of network 250 and to alleviate the service condition associated with the first portion of network 250. In some implementations, network management device 230 may alter the one or more network parameters based on a set of network metrics. For example, network management device 230 may weight network metrics used for a self-organizing network functionality based on the prioritization (e.g., network metrics relating to high priority cells, subscribers, user devices 210, or the like may be prioritized more highly for improvement than network metrics relating to low priority cells, subscribers, user devices 210, or the like). In this case, network management device 230 may geolocate the network metrics (e.g., a location of user device 210 when a connection drop occurs), and may use geolocation information in performing a self-organizing network functionality to, for example, resolve a coverage hole type of service condition.

In some implementations, network management device 230 may communicate with one or more user devices 210 to alter the one or more network parameters. For example, network management device 230 may communicate with low priority user devices 210 to cause the low priority user device 210s to alter a connection retry frequency parameter to a reduced value to reserve connection retry resources for a higher priority user device 210. In some implementations, network management device 230 may communicate with one or more base stations 220 to alter the one or more network parameters. For example, network management device 230 may cause a first base station 220 associated with a first portion of network 250 (e.g., a lower priority, candidate cell) to alter network parameters to cause user devices 210 to connect to the first base station 220, thereby reducing congestion for a second base station 220 associated with a second portion of network 250 (e.g., a higher priority, non-candidate cell).

In some implementations, network management device 230 may alter network parameters (e.g., handover parameters, resource allocations, signal strengths, or the like). Additionally, or alternatively, network management device 210 may select portions of network 250 to which traffic from other portions of network 250 may be directed. In this way, network management device 230 may mitigate the effect of the network outage.

In some implementations, network management device 230 may prevent alterations to a cell based on a prioritization of subscribers using the cell. For example, based on determining that a cell is not a candidate cell, network management device 230 may omit the cell from alteration. Additionally, or alternatively, network management device 230 may prevent alterations to the cell that may have a detrimental effect on the service provided to the high priority subscribers. For example, network management device 230 may determine an alteration to a non-candidate cell to improve service provided to users of the cell.

In some implementations, network management device 230 may reclassify the prioritization. For example, network management device 230 may determine to change a classification of a cell from being a candidate cell to a non-candidate cell based on a change to subscribers associated with the cell, user devices 210 associated with the cell, etc. In this case, network management device 230 may revert parameters for the cell that were changed when the cell was a candidate cell to parameters associated with the cell prior to an outage. Additionally, or alternatively, network management device 230 may alter the parameters for the cell to a set of parameters that are different from the parameters associated with the cell prior to the outage but that mitigate an effect on service provided to a high priority subscriber that is using the cell.

In some implementations, network management device 230 may determine a location of a high priority subscriber, and alter parameters of a candidate cell based on the location of the high priority subscriber. For example, if a high priority subscriber is moving towards an area covered by a candidate cell, then network management device 230 may alter the parameters of the candidate cell proactively to account for the movement of the high priority subscriber.

In some implementations, network management device 230 may adjust the one or more network parameters based on pre-configuring sets of network parameters for service outage scenarios. For example, based on network management device 230 simulating the effect of an outage in a cell, and pre-calculating a network configuration based on the prioritization, network management device 230 may implement the pre-calculated network configuration. In this case, network management device 230 may alter the one or more network parameters based on the pre-calculated network configuration. In some implementations, network management device 230 may base the network parameters based on aggregated performance management statistics, predictive per-subscriber modeling methods, or the like.

In some implementations, network management device 230 may adjust the one or more network parameters based on applying a weighting to user priorities to determine a cell priority. For example, network management device 230 may select network parameters for a particular cell in order to maintain a threshold QoS for a subset of users (and/or user devices 210). In some implementations, network parameters may include whether other user devices 210 transfer to a cell, an allocation of resources within a cell, or the like. For example, network management device 230 may alter network parameters of a high priority cell to allow other user devices 210 to transfer in, but may reserve an increased quantity of resources for high value users (i.e., users associated with a threshold level of prioritization), thus mitigating the impact of additional user devices 210.

In some implementations, network management device 230 may adjust the one or more network parameters to target particular cells for improvements to particular metrics. For example, network management device 230 may configure a target cell for an improvement to throughput (e.g., a threshold level of improvement, such at 5%, 10%, or the like).

In some implementations, network management device 230 may detect a coverage hole in network 250, and may iteratively adjust the network parameters of the second portion of network 250 based on a prioritization and one or more other factors (e.g., based on a configured order of factors, based on an order in which factors become available, or the like). For example, network management device 230 may adjust the network parameters of the second portion of network 250 based on the prioritization and historic information regarding past utilization of the second portion of network 250. Network management device 230 may then monitor network 250, and based on actual performance of the second portion of network 250, network management device 230 may adjust the second portion of network 250 again. Subsequently, network management device 230 may collect subscriber information regarding subscribers in the second portion of network 250. Based on collecting subscriber information (which takes longer), network management device 230 may adjust the second portion of network 250 again. Additionally, or alternatively, network management device 230 may collect location information. Based on collecting location information, network management device 230 may adjust the second portion of network 250 again. In this way, network management device 230 rapidly responds to the service condition and iteratively improves the response to the service condition.

In some implementations, network management device 230 may increase the transmit power of one or more antennas in the cells associated with the coverage hole repeatedly, and determine whether the coverage hole has reduced, whether there are any side-effects such as reduced capacity, or the like. Additionally, or alternatively, network management device 230 may reduce a down tilt for one or more antennas associated with the coverage hole, or the like. Network management device 230 may iteratively perform adjustments to network 250 until a set of criteria relating to a balance between coverage and capacity is satisfied.

In some implementations, network management device 230 may geolocate the coverage hole to determine its location. In some implementations, when network management device 230 determines the location of the coverage hole, network management device 230 may adjust the network parameters based on the prioritization and the location of the coverage hole.

In some implementations, network management device 230 may alter network parameters when a network outage is based on a failed handover of a call between cells (e.g., handover may take place too early, too late, towards the wrong cell, or the like). In some implementations, network management device 230 may alter the network parameters to selectively permit handovers based on a priority of user devices 210 so that outcomes satisfying a threshold score relating to the outcome (e.g., successful handovers being assigned a score that satisfies a threshold) are assigned to high priority user devices 210 and outcomes not satisfying a threshold score (e.g., unsuccessful handovers) are assigned to low priority user devices.

In some implementations, network management device 230 may alter network parameters to perform load balancing. For example, network management device 230 may alter network parameters to alter a distribution of voice calls, data transfers, or the like, between cells and/or base stations 220. In some implementations, network management device 230 may modify network parameters to reduce the congestion in network 250. For example, network management device 230 may alter network parameters (e.g., mobility parameters, layer management parameters, new access request parameters, connection drop parameters, or the like) for a subset of user devices 210 rather than the set of user devices 210 to reduce congestion. In this case, network management device 230 may alter admittance/pre-emption parameters, synchronization parameters, measurement controls, or the like for affected user devices 210, dedicated mode cell reselection/handover parameters for affected cells, or the like, thereby reducing a likelihood of user devices 210 reconnection to network 250, which may reduce congestion on network 250.

In some implementations, network management device 230 may alter network parameters based on cells of interest for important user devices 210. For example, network management device 230 may alter an almost blank subframes (ABS) feature for a cell to allow user devices 210 attached to one cell to measure reference signals of other nearby cells. Based on the alteration, network management device 230 may receive information regarding the reference signals of the other nearby cells and may alter network parameters of network 250 based on the information regarding the reference signals.

In some implementations, network management device 230 may alter network parameters to take into account the potential improvements in network 250. For example, network management device 230 may estimate potential improvements by performing exploratory optimizations to characterize the potential impact that may be achievable with a full optimization. In some implementations, network management device 230 may utilize an exploratory algorithm to model the impact of one change or a small number of changes (e.g., a threshold percentage change) to each parameter that can be optimized and measure the result predicted by the change. Where exploratory changes are found to have a large impact on performance, network management device 230 may determine that the predicted impact of greater changes to network parameters may have even more significant results. Additionally, or alternatively, for a more complete optimization, network management device 230 may alter more network parameters, more parameter values, more combinations of network parameters, some combination of network parameters, or the like.

In some implementations, network management device 230 may perform a combination of techniques to alter network parameters. For example, network management device 230 may perform a combination of two or more of preemptive self-healing, weighted subscriber-centric optimization, location-aware coverage and capacity optimization, subscriber centric mobility robustness optimization, automatic neighbor relations, and subscriber centric problem and opportunity detection.

In some implementations, network management device 230 may alter the one or more network parameters to prioritize one or more subscribers and/or one or more cells based on representative samples of data from connections rather than data from all connections. For example, network management device 230 may use samples of high value connections (i.e., connections associated with subscribers satisfying a threshold level of prioritization) or samples of high value connections in combination with samples of connections not considered high value.

In some implementations, network management device 230 may alter the one or more network parameters to prioritize one or more subscribers and/or one or more cells based on data from high value connections. For example, network management device 230 may assign a nil weight to connections not classified as high importance.

In some implementations, network management device 230 may alter the one or more network parameters to prioritize one or more subscribers and/or one or more cells based on weighted subscriber centric optimization. For example, network management device 230 may use weighted subscriber centric optimization as a mitigation for an outage of one or more cells in a self-healing optimization in either a pre-calculated mitigation or calculated in response to an actual outage.

In some implementations, network management device 230 may alter the one or more network parameters to prioritize one or more subscribers and/or one or more cells based on weighted subscriber centric optimization as a means of coverage and capacity optimization.

In some implementations, network management device 230 may alter the one or more network parameters to prioritize one or more subscribers and/or one or more cells based on weighted subscriber centric optimization. For example, network management device 230 may use weighted subscriber centric optimization as a means of load balancing.

In some implementations, network management device 230 may alter one or more network parameters to prioritize one or more subscribers and/or one or more cells based on a time sliced optimization that allows for additional resources for higher priority subscribers to be made available for discrete scheduled intervals of time.

In some implementations, network management device 230 may alter one or more network parameters to prioritize one or more subscribers and/or one or more cells based on the use of user device 210 to user device 210 communication to enhance service for the higher priority subscribers. For example, network management device 230 may alter network parameters to permit only higher priority subscribers, relative to other subscribers, performing device-to-device communication to have network resources. In this way, network management device 230 may enhance service for the higher priority subscribers. As another example, network management device 230 may alter network parameters to cause non-priority subscribers to transfer to using device-to-device communication to reserve resources for priority subscribers.

In some implementations, network management device 230 may alter the one or more network parameters to prioritize one or more subscribers and/or one or more cells based on QoS and/or quality of experience (QoE) delivered to the high priority users. Additionally, or alternatively, network management device 230 may prioritize one or more subscribers and/or one or more cells based on a proxy metric for the QoS and/or QoE. For example, with regard to a dropped call rate and frame erasure rate, network management device 230 may determine a predictive relationship using a Reference Signal Received Quality (RSRQ) metric or Reference Signal Received Quality (RSRP) metric. In this case, network management device 230 may alter the one or more network parameters to cause an alteration to the RSRQ or RSRP metric rather than based on a dropped call rate or frame erasure rate, thereby permitting network management device 230 to perform corrective action more rapidly than another technique that requires determining the dropped call rate or the frame erasure rate.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
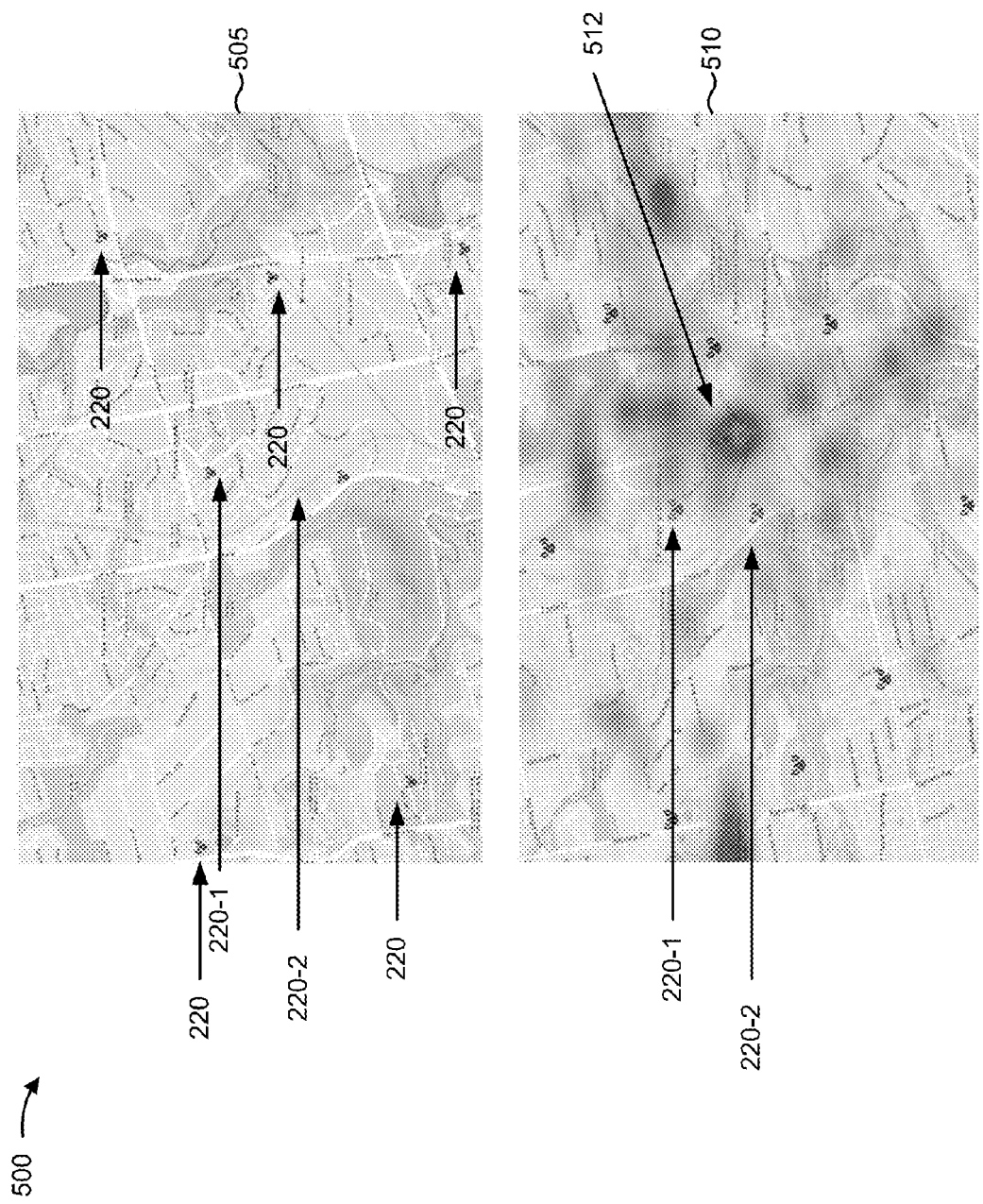
FIGS. 5A-5C are diagrams of an example implementation relating to the example process shown in FIG. 4.
Figure 5B:
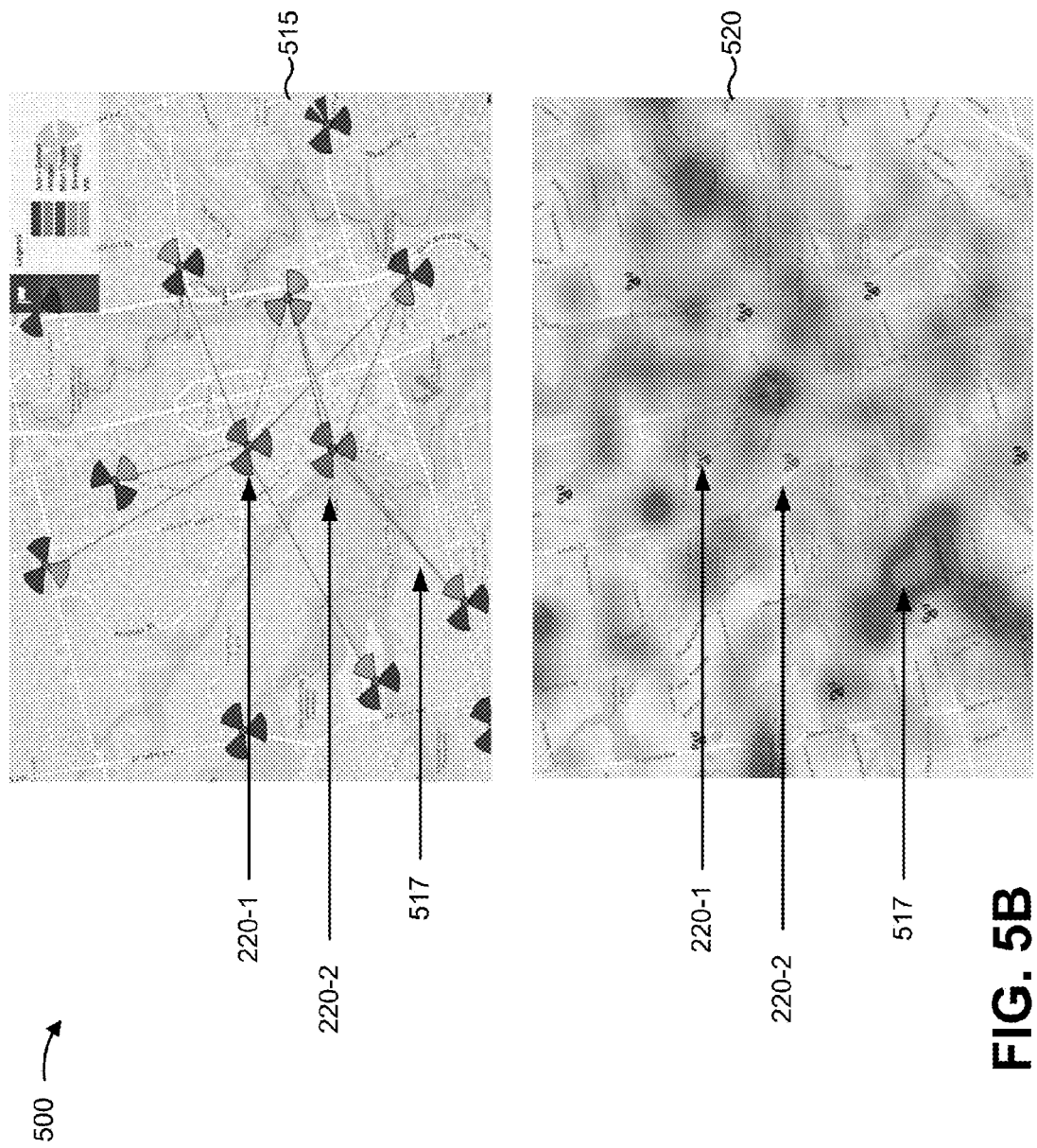
Figure 5C:
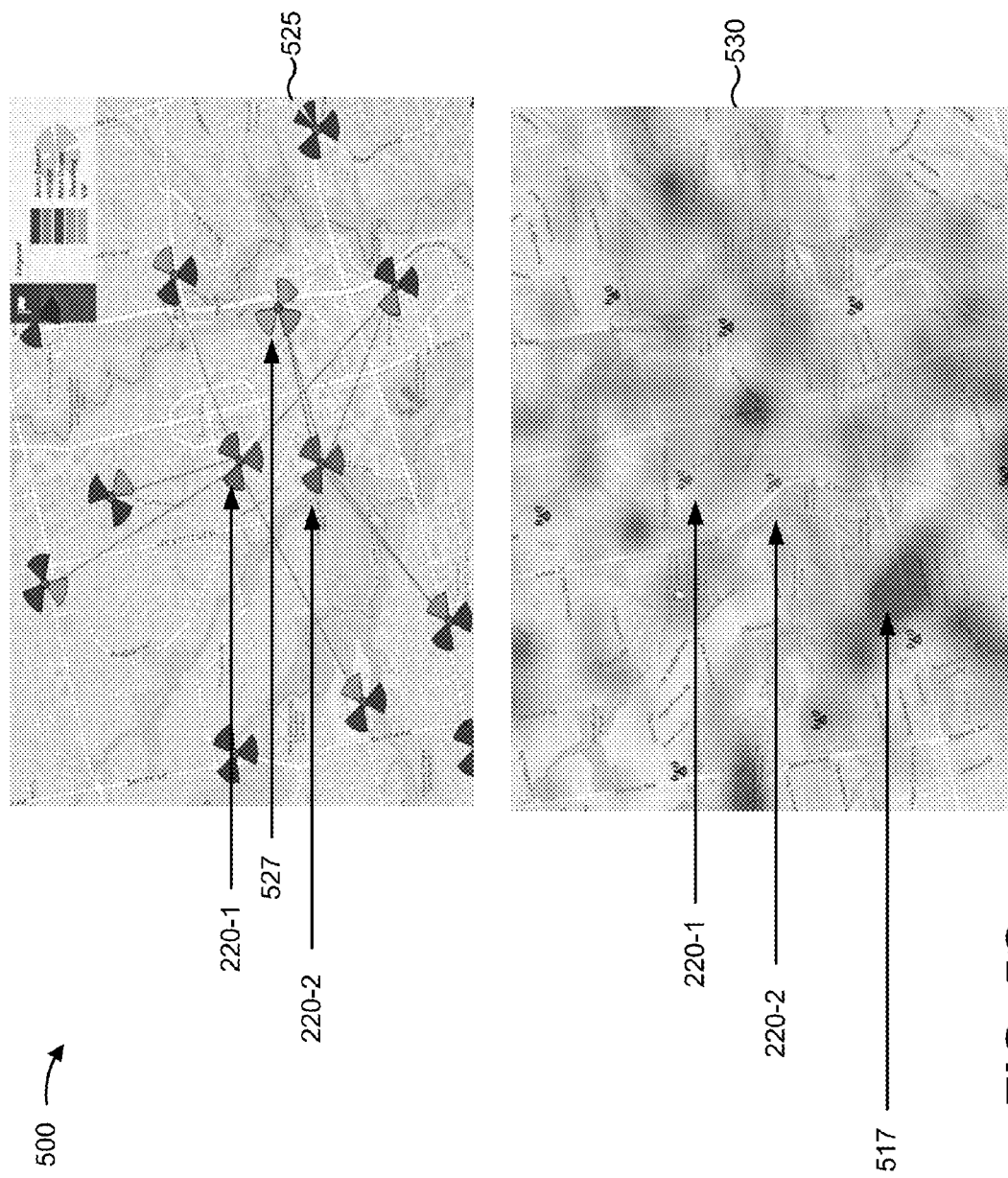

FIGS. 5A-5C are diagrams of an example implementation 500 relating to example process 400 shown in FIG. 4. FIGS. 5A-5C show an example of network optimization based on characteristic information regarding a network.

As shown in FIG. 5A, and by reference number 505, implementation 500 may include a set of base stations 220 at a particular location. As shown by reference number 510, network 250 may be experiencing a service outage at a location 512, and a base station 220-1 and a base station 220-2 may be unable to service subscribers as a result of the service outage.

As shown in FIG. 5B, and by reference number 515, an initial response action that does not account for prioritization of portions of the network is performed. Based on the response action, the service outage in the particular location may be resolved based on a group of base stations 220 providing service to the areas, such as location 517, covered by base stations 220-1 and 220-2. As shown by reference number 520, based on the initial response action, an area within a threshold proximity of base stations 220-1 and 220-2 experiences a reduced outage severity; however, location 517 experiences a service outage.

As shown in FIG. 5C, diagram 525 shows another response action that network management device 230 may perform based on a prioritization of cells and a pre-configured set of network parameters (e.g., based on simulating the service outage in advance of the service outage). In this case, network management device 230 determines to exempt a cell 527 from providing network resources to resolve the service outage with base stations 220-1 and 220-2, which causes high priority subscribers to connect to cell 527 rather than, for example, base stations 220 providing coverage at location 517. As shown by reference number 530, based on a response of base stations 220 to cell 527 being exempt from providing network resources, base stations 220 cause the service outage to be resolved without a service outage at location 517.

As indicated above, FIGS. 5A-5C are provided merely as an example. Other examples are possible and may differ from what was described with regard to FIGS. 5A-5C.

Implementations described herein may classify portions of network 250 based on a prioritization associated with a set of user devices 210 to which network 250 provides connectivity and may alter network parameters of network 250 based on the prioritization. For example, network management device 230 may determine the prioritization based on a subscriber identity, a current or historic subscriber activity, a current or historic subscriber billing activity, a subscriber class (e.g., that the subscriber provides emergency management services), an importance of the current subscriber activity (e.g., a two-party call versus a conference call or an emergency call), or the like, and may utilize the prioritization to determine which network parameters to alter. In this way, when the second portion of network 250 is classified as a higher priority than the first portion of network 250 (e.g., associated with user devices 210 of a relatively higher subscriber priority level or transferring traffic with a relatively higher importance), network management device 230 may omit the second portion of network 250 from utilization in relieving the service condition of the first portion of network 250, which may enhance network performance for the higher priority devices, ensure that emergency services retain connectivity during an emergency incident, result in more effective SON optimization, or the like. In this way, network performance may be improved based on ensuring that network resources are allocated correctly for requirements of different portions of network 250 and/or user devices 210 connected to the different portions of network 250.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a priority being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    classifying, by a device, a first subset of subscribers as high priority subscribers relative to a second subset of subscribers of one or more subscribers, based on characteristics of a plurality of subscribers,
        the plurality of subscribers including the first subset of subscribers and the second subset of subscribers;
    determining, by the device, a service condition relating to a first cell of a network,
        the service condition relating to a network outage or a degraded network performance;
    determining, by the device, a prioritization for a plurality of cells of the network based on determining the service condition relating to the first cell of the network,
        the plurality of cells of the network including the first cell of the network,
        the prioritization for a respective cell of the network, of the plurality of cells of the network, being based on the high priority subscribers that are associated with user devices connected to the network in the respective cell of the network, and
        the prioritization for the respective cell of the network being based on whether a user device associated with the high priority subscribers has been active in the respective cell within a threshold period of time; and
    altering, by the device, one or more network parameters associated with a second cell of the network, of the plurality of cells of the network, based on a comparison of a prioritization of the second cell of the network to a prioritization of at least one other cell of the network, of the plurality of cells of the network.

2. The method of claim 1, further comprising:
    detecting the service condition,
        the service condition occurring for the first cell of the network,
    where determining the service condition comprises:
        determining the service condition based on detecting the service condition.

3. The method of claim 1, further comprising:
    generating a simulated service condition,
        the simulated service condition being a predicted service condition for the first cell of the network; and
    where determining the service condition comprises:
        determining the service condition based on generating the simulated service condition.

4. The method of claim 1, further comprising:
    determining that a third cell of the network, of the plurality of cells of the network, is associated with a particular level of the prioritization,
        the particular level of the prioritization being a relatively higher level compared to a level associated with the second cell of the network; and
    omitting the third cell of the network from parameter alteration based on determining that the third cell of the network is associated with the particular level of the prioritization.

5. The method of claim 1, where the prioritization for the plurality of cells of the network is related to characteristics of one or more user devices connected to the network.

6. The method of claim 1, further comprising:
    determining that a subscriber is moving from a first location to a second location; and
    where altering the one or more network parameters comprises:
        altering the one or more network parameters to maintain a level of service for the subscriber based on determining that the subscriber is moving from the first location to the second location.

7. The method of claim 1, where altering the one or more network parameters comprises:
    altering a coverage area serviced by a particular cell of the network, of the plurality of cells of the network, within a threshold proximity of the first cell of the network.

8. The method of claim 1, where altering the one or more network parameters comprises:
    altering the one or more network parameters based on an availability of device to device communication for user devices utilizing the network.

9. The method of claim 1, where the service condition relates to a particular type of activity,
    the particular type of activity including at least one of:
        a maintenance activity, or
        an energy saving activity.

10. The method of claim 9, where altering the one or more network parameters comprises:

altering the one or more network parameters based on the particular type of activity.

11. The method of claim 1, where altering the one or more network parameters comprises:
   altering the one or more network parameters to reduce an impact of the service condition on the first subset of subscribers relative to the second subset of subscribers.

12. A non-transitory computer-readable medium storing instructions, the instructions comprising:
   one or more instructions that, when executed by one or more processors, cause the one or more processors to:
      classify a first subset of subscribers as high priority subscribers relative to a second subset of subscribers of the one or more subscribers, based on characteristics of a plurality of subscribers,
         the plurality of subscribers including the first subset of subscribers and the second subset of subscribers;
      determine a set of characteristics of a set of user devices connected to cells of a network;
      determine a prioritization of the cells of the network based on the set of characteristics of the set of user devices connected to the cells of the network and based on the high priority subscribers that are associated with user devices connected to the network in a respective cell of the network,
         the prioritization for a respective cell of the network being based on whether a user device associated with the high priority subscribers has been active in the respective cell within a threshold period of time; and
      classify the cells of the network as candidate cells or non-candidate cells based on the prioritization of the cells of the network;
      detect a service condition relating to a cell of the cells of the network; and
      perform an alteration to one or more network parameters of the candidate cells to mitigate an impact of the service condition based on a set of network metrics relating to the network and based on a comparison of the prioritization of the candidate cells of the network.

13. The non-transitory computer-readable medium of claim 12, where the one or more instructions, when executed by the one or more processors, further cause the one or more processors to:
   maintain the one or more network parameters of the non-candidate cells after detecting the service condition to maintain a level of service for user devices, of the set of user devices, connected to the non-candidate cells.

14. The non-transitory computer-readable medium of claim 12, where the one or more instructions, when executed by the one or more processors, further cause the one or more processors to:
   perform an alteration to another one or more network parameters of a non-candidate cell, of the non-candidate cells, to mitigate the impact of the service condition,
      the alteration to the other one or more network parameters including a first alteration to permit a first one or more user devices, of the set of user devices, to connect to the non-candidate cell,
      the alteration to the other one or more network parameters including a second alteration to increase a resource allocation to a second one or more user devices, of the set of user devices, connected to the non-candidate cell prior to detecting the service condition.

15. The non-transitory computer-readable medium of claim 12, where the one or more instructions, that cause the one or more processors to perform the alteration to the one or more network parameters, cause the one or more processors to:
   alter the one or more network parameters based on a stored set of parameters determined based on simulated service conditions.

16. The non-transitory computer-readable medium of claim 12, where the one or more instructions, that cause the one or more processors to perform the alteration to the one or more network parameters, cause the one or more processors to:
   perform a first alteration to the one or more network parameters;
   determine an impact, of the first alteration to the one or more network parameters, to the network; and
   perform a second alteration to the one or more network parameters based on the impact of the first alteration.

17. The non-transitory computer-readable medium of claim 12, where the one or more instructions, when executed by the one or more processors, cause the one or more processors to:
   determine a target improvement to a metric relating to network performance of the network for one or more subscribers associated with one or more user devices of the set of user devices,
      the one or more subscribers being classified as high priority subscribers relative to other subscribers of other user devices of the set of user devices; and
   determine the alteration to the one or more network parameters to achieve the target improvement to the metric for the one or more subscribers.

18. A device, comprising:
   one or more processors configured to:
      classify a first subset of subscribers as high priority subscribers relative to a second subset of subscribers of one or more subscribers, based on characteristics of a plurality of subscribers,
         the plurality of subscribers including the first subset of subscribers and the second subset of subscribers;
      detect a service condition associated with a network;
      determine a prioritization of cells of the network based on the service condition associated with the network,
         the prioritization for a respective cell of the network being based on the high priority subscribers that are associated with user devices connected to the network in the respective cell of the network, and
         the prioritization for the respective cell of the network being based on whether a user device associated with the high priority subscribers has been active in the respective cell within a threshold period of time; and
      perform an alteration to one or more network parameters based on a comparison of the prioritization of cells of the network to reduce an impact of the service condition.

19. The device of claim 18, where the one or more processors are further configured to:
   geolocate a set of metrics relating to utilization of the network; and utilize a self-organizing network functionality to determine the alteration to the one or more network parameters based on geolocating the set of metrics.

20. The non-transitory computer-readable medium of claim 12, where the one or more instructions, that cause the one or more processors to classify the cells of the network as the candidate cells or the non-candidate cells, cause the one or more processors to:

classify a cell of the network as a non-candidate cell when the user device associated with the high priority subscribers has been active in the respective cell within the threshold period of time.

\* \* \* \* \*